(12) United States Patent
Winter et al.

(10) Patent No.: US 6,206,627 B1
(45) Date of Patent: Mar. 27, 2001

(54) LOADING DEVICE FOR CONTAINERS OR SIMILAR

(76) Inventors: Udo Winter, Losensteinerstrasse 23, A-4020 Linz (AT); Johann Schabelreiter, Kirchdorf 20, A-8132 Pernegg (AT); Werner Martin, Simchengasse 2, A-8045 Graz (AT); Johannes Wunder, Seestrasse 52a, A-3224 Mitterbach (AT)

(*) Notice: Subject to any disclaimer, the term of this patent is extended or adjusted under 35 U.S.C. 154(b) by 0 days.

(21) Appl. No.: 09/319,155
(22) PCT Filed: Dec. 3, 1997
(86) PCT No.: PCT/AT97/00265
  § 371 Date: Jul. 21, 1999
  § 102(e) Date: Jul. 21, 1999
(87) PCT Pub. No.: WO98/24655
  PCT Pub. Date: Jun. 11, 1998

(30) Foreign Application Priority Data

Dec. 3, 1996 (AT) .................................................. 2097/96

(51) Int. Cl.$^7$ ...................................................... B60P 1/48
(52) U.S. Cl. .......................... 414/547; 414/555; 212/258
(58) Field of Search .................................. 414/546, 547, 414/549, 555; 212/258, 261

(56) References Cited

U.S. PATENT DOCUMENTS

| 3,513,997 | | 5/1970 | Heyer et al. | |
|---|---|---|---|---|
| 3,612,308 | * | 10/1971 | Klaus | 414/547 X |
| 3,616,949 | * | 11/1971 | Klaus | 414/555 |
| 3,726,421 | * | 4/1973 | Goldhofer | 414/547 |
| 3,780,877 | * | 12/1973 | Levitt | 414/555 X |
| 3,827,743 | * | 8/1974 | Visser | 414/555 X |
| 4,921,394 | * | 5/1990 | Watson | 414/547 X |
| 5,688,100 | * | 11/1997 | Wunder et al. | 414/547 |

FOREIGN PATENT DOCUMENTS

| 2650979 | * | 2/1991 | (FR) | 414/549 |
|---|---|---|---|---|
| 95/00357 | | 1/1995 | (WO). | |

* cited by examiner

Primary Examiner—James W. Keenan
(74) Attorney, Agent, or Firm—Collard & Roe, P.C.

(57) ABSTRACT

A loading device for containers (C) comprises a pair of loading units (2), each having a telescopic column (4) supported on a bracket (3) so as to be swivelled about a common swivel axis (I). The telescopic column consists of a lower portion (9), an upper portion (11) and a column cylinder (17) moving the upper portion (11) with respect to the lower portion (9). Actuating cylinders (5) are connected to the lower portion (9) on both sides, and the upper portion (11) accommodates an extension arm (14) which can be swivelled about a swivel axis (III) parallel to the swivel axis (I) of the telescopic column. To expand the loading possibilities, the upper portion (11) carries a column head (12) which forms a slot-shaped swivel guide (18) with cam tracks (19) limiting the swivelling of the extension arm (14). The extension arm (14) has guide members (20) and is pivotally connected with a sliding piece (13) movably seated inside the upper portion (11) which opens towards the swivel guide (18), where a constriction (21) is provided between the cam tracks (19), so that the guide members (20) of the extension arm (14) aligned in a position stretched with respect to the telescopic column (4) simultaneously contact both cam tracks (19), and on the side of the upper portion the column cylinder (17) acts on the sliding piece (13) which can be moved upwards along a path limited by a stop.

6 Claims, 3 Drawing Sheets

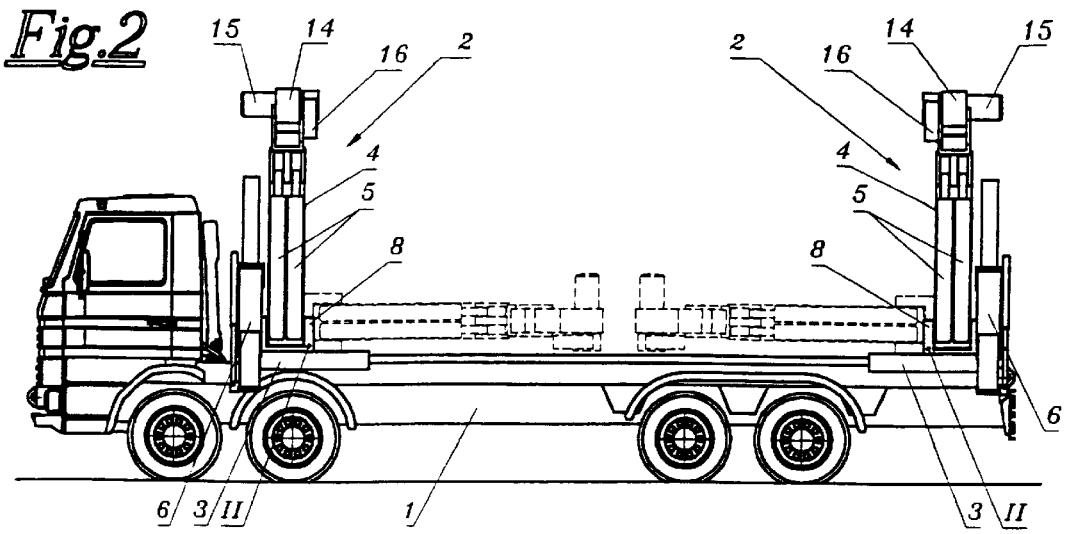
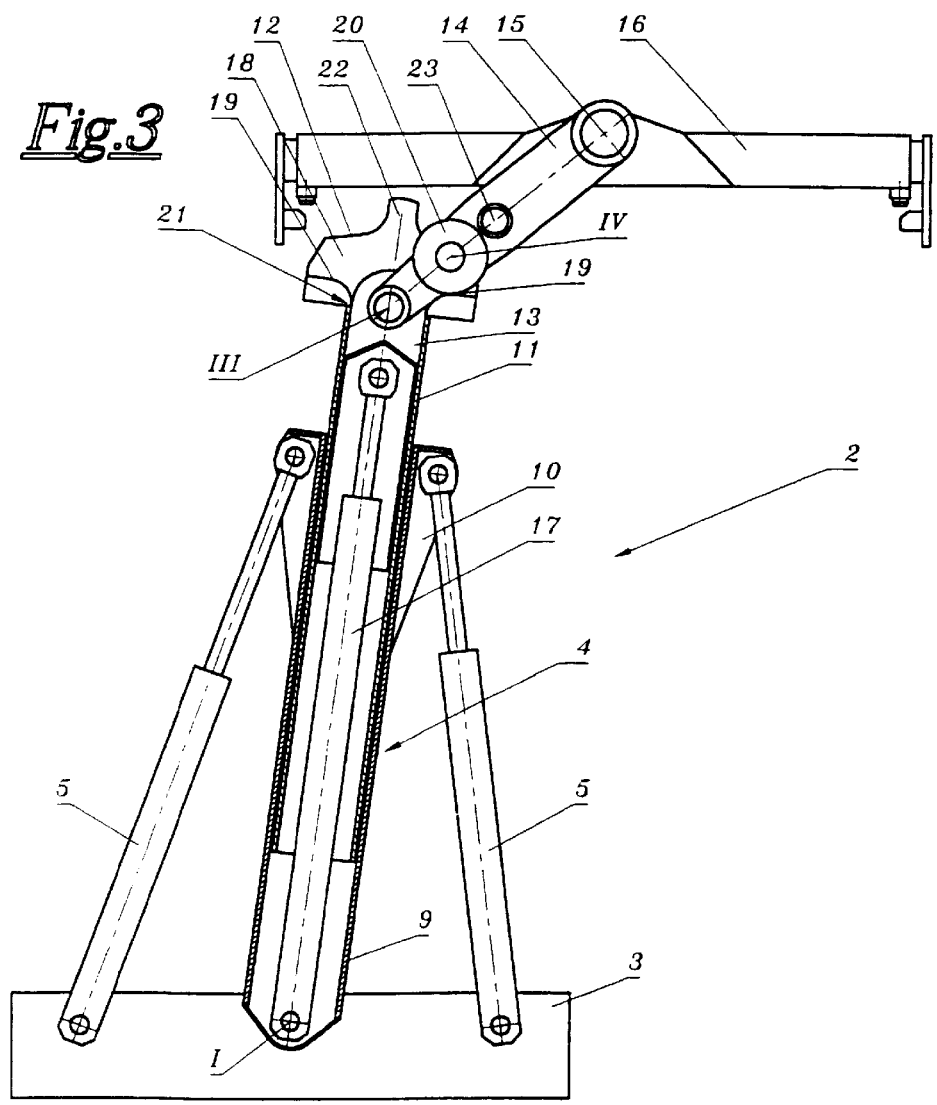

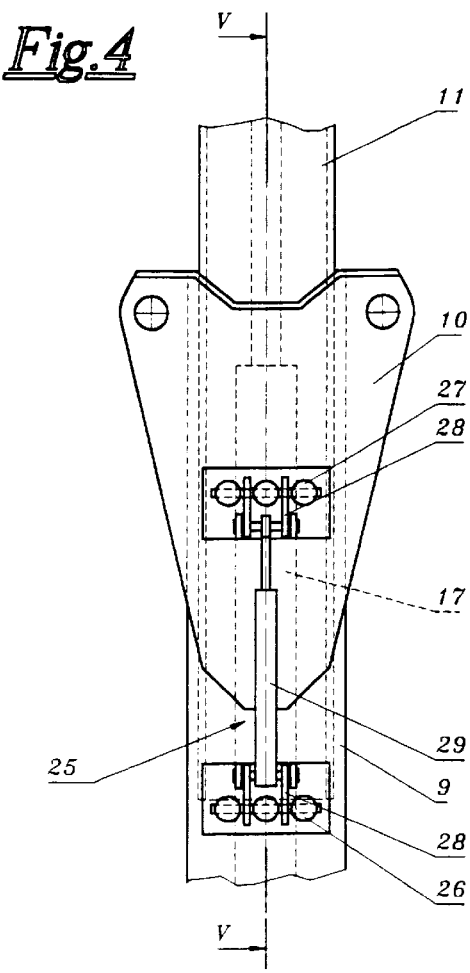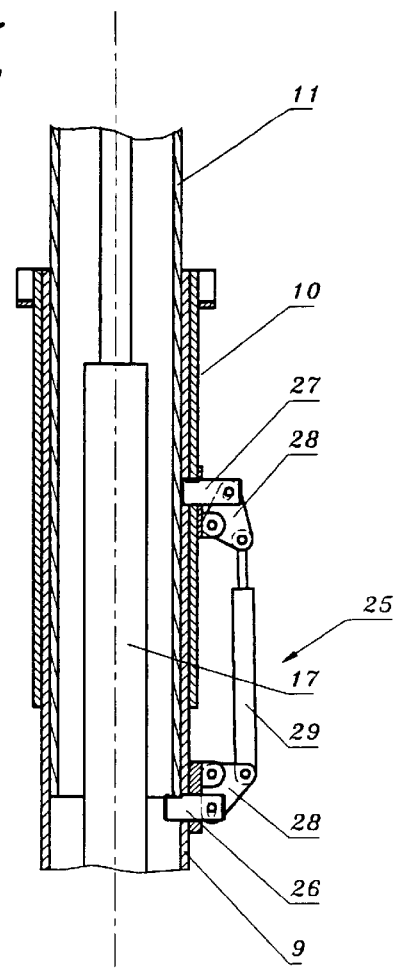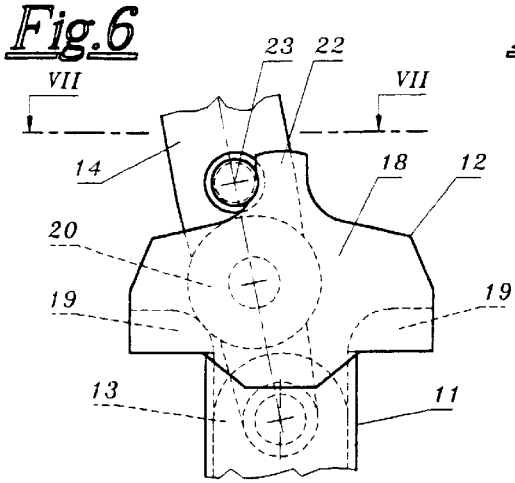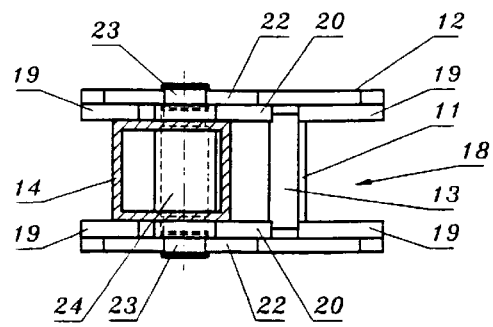

LOADING DEVICE FOR CONTAINERS OR SIMILAR

BACKGROUND OF THE INVENTION

1. Field of the Invention

This invention relates to a loading device for containers or the like, comprising a pair of loading units to be mounted on an undercarriage, which each have a telescopic column supported on a bracket so as to be swivelled about a common swivel axis extending in the longitudinal center of the undercarriage, which telescopic column consists of a lower portion pivotally mounted on the bracket, an upper portion movably guided in the lower portion, and a column cylinder moving the upper portion with respect to the lower portion, where actuating cylinders act on the lower portion on both sides, and the upper portion accommodates an extension arm which can be swivelled to both sides about a swivel axis parallel to the swivel axis of the telescopic column and has an abutment for connection of a load lifting means.

2. Description of the Prior Art

Such loading device is known for instance from EP 0 705 179 A, and it is also well-tried because of its relatively simple and compact design, its sturdiness and its small space requirement as compared to the loading area. However, in the known loading device the extension arm of the telescopic columns can only be swivelled from one side to the other free from load, so that for a loading operation where a container must be moved from one side of the undercarriage to the other the container must be deposited on the undercarriage to relieve and swivel the extension arm, which is time-consuming and complicated. And under load, the extension arm can only be used in its stop-limited lateral swivel position, which involves a certain restriction of the loading possibilities.

SUMMARY OF THE INVENTION

It is therefore the object underlying the invention to create a loading device as described above, which allows to swivel containers through from one side of the undercarriage to the other, and by swivelling the extension arms even under load involves an expansion of the loading area and the prerequisite for stacking the containers.

This object is solved by the invention in that the upper portion of the telescopic column carries a column head which forms a slot-shaped swivel guide with cam tracks limiting the swivelling range on both sides for the extension arm, that the extension arm has guide members associated to the cam tracks and is pivotally connected with a sliding piece movably seated inside the upper portion which opens towards the swivel guide of the column head, where in the vicinity of the orifice a constriction is provided between the cam tracks, so that the guide members of the extension arm aligned in a position stretched with respect to the telescopic column simultaneously contact both cam tracks, and that on the side of the upper portion the column cylinder acts on the sliding piece which can be moved upwards in a stop-limited way.

The actuating cylinders can swivel the telescopic column towards both sides in the usual way about the common swivel axis extending in the longitudinal center of the undercarriage, where independent of the respective swivel position the column cylinder inside the telescopic column remains actuatable in both directions. When the column cylinder has been retracted to its starting position, it has on the one hand brought the upper portion to its lowermost position and on the other hand retracted the extension arm into the upper portion via the sliding piece, so that the extension arm moving together with the guide members along the cam tracks is in alignment with the telescopic column. When the column cylinder is extended, the sliding piece is moved upwards, so that corresponding to the swivel position of the telescopic column the extension arm moving upwards swivels towards the one or the other side corresponding to the cam track guiding the guide pieces and swings to the corresponding side. When the lateral swivel limit has been reached because the sliding piece strikes against the limit stop, the upper portion is lifted out of its basic position when the column cylinder is extended further via the sliding piece, and can be moved upwards with respect to the lower portion up to a desired extended position. Along with the possibilities for swivelling the telescopic column to the side there are thus obtained the different loading possibilities, where the movements of the telescopic column and also of the extension arm can easily be effected even under load due to the correspondingly strongly dimensioned column cylinder. It is thus also easily possible to for instance pick up a container standing on the one side of the undercarriage, then lift it up and swivel it to the other side of the undercarriage and let it down again and deposit it, or to bring a container from the loading surface of an adjacent vehicle to the opposite side of the undercarriage, and the like.

To ensure that the extension arm can be swivelled properly by means of the column cylinder, the upper portion of the telescopic column must be firmly supported with respect to the lower portion, which support is provided from the start in the retracted telescope position. To be able to perform a swivel movement of the extension arm also in various extended positions of the telescopic column, the lower portion of the telescopic column is equipped with a locking device for selectively locking the upper portion in one or more extended positions, so that the swivel height of the extension arm and thus also the loading height of the containers can be chosen as desired. With such a predeterminable working height of the telescopic column and of the extension arm it is now also possible to lift containers to such an extent and swivel them to the side that a container can be deposited on a ramp of a corresponding height, a loading surface of a vehicle, but also for stacking purposes on a container already deposited there, or can be picked up from a storage area of a corresponding height.

As guide members for the extension arm there might be provided suitable sliding surfaces or the like, but as guide member the extension arm expediently has a guide roller rotatably mounted about an axis of rotation parallel to the swivel axis of the extension arm, which guide roller has a diameter adapted to the constriction between the cam tracks. Such guide roller provides for a smooth, low-noise relative movement between extension arm and column head and also ensures an exact guidance of the extension arm when swivelling the same and when aligning the same in the vicinity of the constriction.

To prevent that in the case of a swivel movement of the telescopic column during the actuation of the column cylinder an undesired reversal of the extension arm from one swivel side to the other takes place, which in the case of a higher load might lead to a damage of the loading device, the extension arm movement along a corresponding connecting link guide might be forcibly controlled, which would, however, involve the risk of jams and the like. It would therefore be more expedient to equip the extension arm with a locking bar associated to a locking projection of the column head as a protection against reversal, which locking bar strikes against the locking projection when the extension arm swivels upwards before reaching the stretched position, and prevents a further movement. Only when a deliberate unlocking is effected can the lock be removed and the reversal be effected.

When in accordance with a further aspect of the invention the telescopic column together with the actuating cylinders is mounted on a carriage of the bracket which is movable transverse to the swivel axis, the loading area can be expanded further to the side due to this transverse adjustability, and there is an increase in the possible uses of the loading device.

It is also expedient when in accordance with the invention the bracket has an upper structure to be folded down about a lying transverse axis, which upper structure carries the telescopic column together with the actuating cylinders, so that the parts of the loading device usually protruding above the driver's cab can be folded down for a railway transport or the like in the unloaded condition to reduce the transport height.

BRIEF DESCRIPTION OF THE DRAWING

In the drawing, the subject-matter of the invention is illustrated by way of example, wherein:

FIG. 2 represents a vehicle with an inventive loading device in a side view, FIG. 3 represents a telescopic column of the loading device in a partly sectional rear view on an enlarged scale, FIGS. 4 and 5 represent the locking device of the telescopic column in a top view and in a cross-section along line V—V of FIG. 4, and FIGS. 6 and 7 represent the column head of the telescopic column in a rear view and in a cross-section along line VII—VII of FIG. 6, likewise on an enlarged scale.

DESCRIPTION OF THE PREFERRED EMBODIMENT

Figure 1:
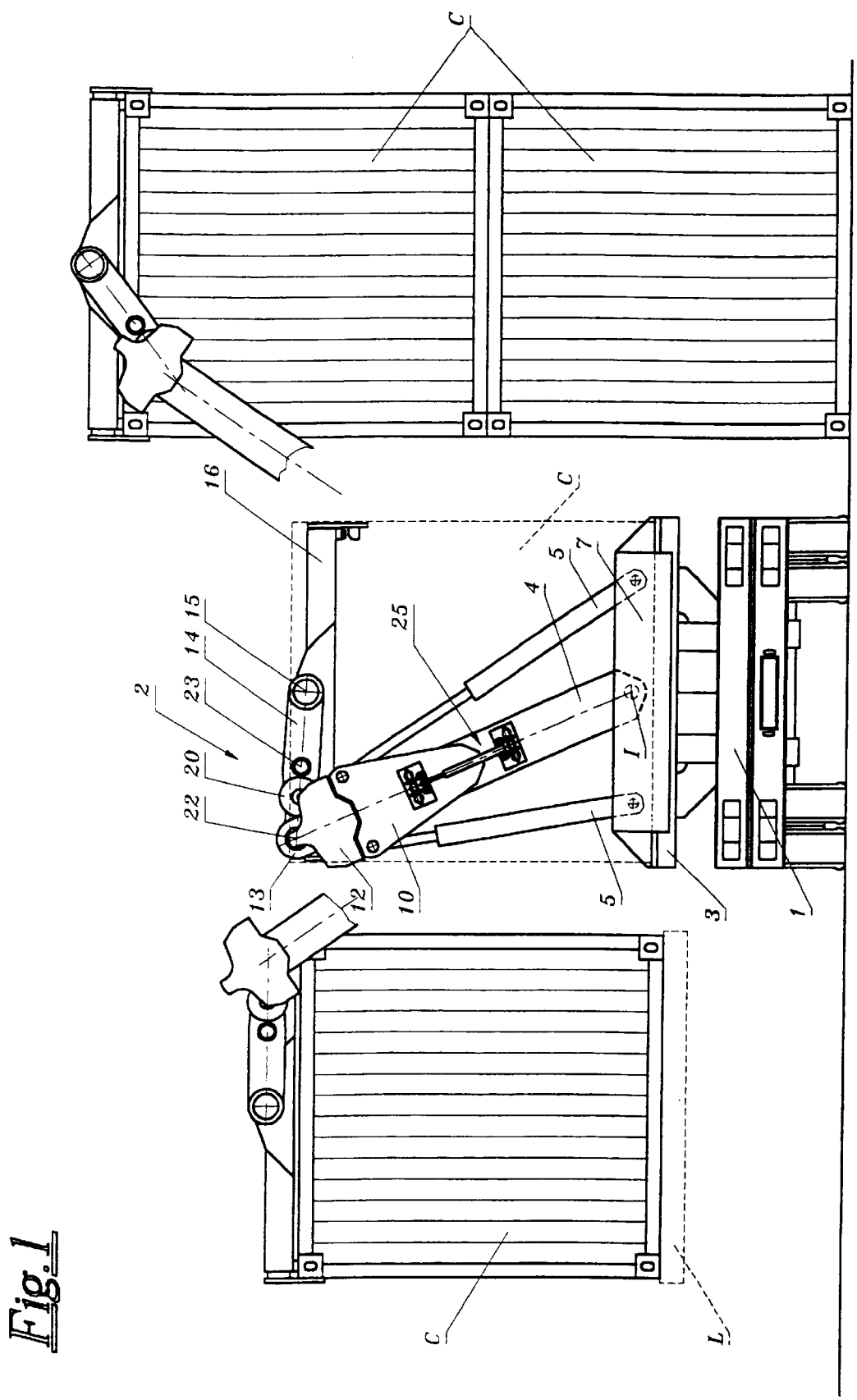
FIG. 1 represents a vehicle with an inventive loading device in various loading positions by means of a rear view.

On an undercarriage 1, for instance a truck, there is mounted a loading device for containers C comprising two loading units 2, where each loading unit 2 consists of a bracket 3, a telescopic column 4 supported on the bracket 3 so as to be swivelled about a swivel axis I extending in the longitudinal center of the undercarriage 1, which telescopic column has actuating cylinders 5 acting on both sides, and of supporting legs 6 to be swivelled down towards both sides, which for the sake of clarity are only indicated in FIG. 2. As is represented in FIG. 1, the bracket 3 can have a carriage 7 movable transverse to the swivel axis I for accommodating the telescopic column 4 and the actuating cylinders 5, so as to be able to expand the loading area by means of a lateral displacement of the loading units 2. As is shown in FIG. 2, it is also possible to equip the brackets 3 with an upper structure 8 to be folded down about a lying transverse axis 11 for accommodating the telescopic column 4 and the actuating cylinders 5, in order to fold down the protruding parts (represented in broken lines) to reduce the transport height of the unloaded vehicle. The upper structure possibly can, in a manner not represented in detail, also accommodate the supporting legs 6 in addition to the telescopic column, so that the entire loading units can be folded down.

As can be taken in particular from FIG. 3, the telescopic column 4 consists of a lower portion 9 pivotally mounted on the bracket 3, on which act the actuating cylinders 3 via suitable connecting plates 10, of an upper portion 11 movably guided in the lower portion 9, which at its free end carries a column head 12, of a sliding piece 13 movably inserted inside the upper portion 11, on which an extension arm 14 with an abutment 15 is pivotally mounted about a swivel axis III parallel to the swivel axis I for connection of a load lifting means 16, for instance a carrying gear for picking up a container, and of a column cylinder 17 which is supported on the one hand on the lower portion 9 or on the swivel axis I and which on the other hand acts on the sliding piece 13, which can be moved upwards from the upper portion 11 into the column head 12 up to a limit stop not represented in detail. The column head 12 forms a slot-shaped swivel guide 18 for the extension arm 14, where the swivelling range is limited by lateral cam tracks 19. The extension arm 14 is equipped with guide members associated to the cam tracks 19, for instance with guide rollers 20 rotatable about an axis of rotation IV parallel to the swivel axis III, which guide rollers 20 have been adapted in their diameter to the constriction 21 between the two cam tracks 19 provided in the vicinity of the orifice of the upper portion 11 towards the swivel guide 18 of the column head 12, so that in the case of a retraction of the sliding piece 13 the extension arm 14 can be aligned in a position stretched with respect to the telescopic column 4.

The column head 12 forms a central locking projection 22 to which there is associated a locking bar 23 of the extension arm 14 as a protection against reversal, where the locking bar 23 for instance constitutes a double-acting locking cylinder 24 for selectively locking or unlocking.

At the lower portion 9 of the telescopic column 4 a locking device 25 is provided, which consists of two locking combs 26, 27 spaced from each other in longitudinal direction of the column and of an actuating cylinder 29 pivotally mounted on the two locking combs via swivelling levers 28, so that by actuating the actuating cylinder 29 both locking combs 26, 27 are disengaged or alternately the one or the other can be engaged in its locking position. In the locking positions, the locking combs protrude through corresponding openings into the lower portion 9 and engage below the upper portion 11 in a middle or upper extended position, where by means of a positive connection between the locking combs and the upper portion or a correspondingly weak dimensioning of the actuating cylinder 29 unlocking is not possible when the upper portion is loaded.

The inventive loading units 2 not only provide for an extension or retraction or a swivel movement of the telescopic column 4, but also for a swivel movement of the extension arm 14 and also a reversal of this extension arm 14 under load, so that there is obtained a wide range of applications with all kinds of loading possibilities. As is indicated in FIG. 1, a container C can for instance be picked up from an elevated loading surface L or be deposited on such elevated loading surface L, it is possible to transfer the container C from one side of the vehicle to the other and deposit the container on the ground, but also to stack two containers C on top of each other. In addition, the loading units 2 can be brought into a transport position, which, as is likewise indicated in FIG. 1, finds room inside the outer contour of a loaded container C.

The lateral swivel movements of the telescopic column 4 are performed via the actuating cylinders 5, where independent of the swivel positions the inner column cylinder 17 can be actuated for swivelling the extension arm 14 or for extending and retracting the upper portion 11. For instance, when the column cylinder 17 in the position represented in FIG. 3, which corresponds to a first extended position of the upper portion with a locking by the lower locking comb 26, is acted upon in extension direction, the sliding piece 13 is moved upwards and the extension arm 14 is thus swivelled out to the side while the guide rollers 20 roll along the cam track 19, where by swivelling the telescopic column 4 to the side the extension width can be increased. When the column cylinder 17 is retracted, the extension arm 14 is swivelled upwards in direction of the stretched position due to the locking of the upper portion 11, until the locking bar 23 rests against the locking projection 22, which prevents an undesired reversal of the extension arm 14. When the locking bars 23 are unlocked, a further retraction of the column cylinder 17 can retract the sliding piece 13 into the upper portion 11 up to the stretched position of the extension arm 14, where the guide rollers 20 now simultaneously rest against both cam tracks 19 in the vicinity of the constriction 21 and stabilize the central position of the extension arm 14. When during this retraction operation or upon reaching the stretched position the telescopic column 4 has swivelled from the one side to the other, the extension arm 14 with its guide rollers 20 can swivel to the other side along the other guideway 19 during an upward movement of the sliding piece 13 and take along the load picked up during its swivel movement. When the reversal is terminated and the sliding piece 13 has reached its limit stop during the extension of the column cylinder 17, the upper portion 11 is extended during a further extension of the column cylinder 17 together with the sliding piece 13, which leads to an elevation of the telescopic column 14. As soon as the upper portion relieves the locking device 25, the locking comb 26 can be withdrawn, and possibly after a corresponding extension of the upper portion 11 the higher located locking comb 27 can be inserted, so that now in a further extended position, for instance in a stacked position, the extension arm 14 can again be swivelled by retracting the column cylinder 17.

What is claimed is:

1. A loading device for containers comprising a pair of loading units to be mounted on an undercarriage, which each have a telescopic column supported on a bracket so as to be swivelled about a common swivel axis extending in the longitudinal center of the undercarriage, which telescopic column consists of a lower portion pivotally mounted on the bracket, an upper portion movably guided in the lower portion, and a column cylinder moving the upper portion with respect to the lower portion, where actuating cylinders are connected to the lower portion on both sides, and the upper portion accommodates an extension arm which can be swivelled to both sides about a swivel axis parallel to the swivel axis of the telescopic column and has an abutment for connection of a load lifting means, characterized in that the upper portion carries a column head which forms a slot-shaped swivel guide with cam tracks limiting the swivelling of the extension arm, that the extension arm has guide members associated with the cam tracks and is pivotally connected with a sliding piece movably seated inside the upper portion which has an open end facing the swivel guide of the column head, where in the vicinity of the open end a constriction is provided between the cam tracks so that the guide members of the extension arm aligned in a position stretched with respect to the telescopic column simultaneously contact both cam tracks, and that on the side of the upper portion the column cylinder acts on the sliding piece which can be moved upwards along a path limited by a stop.

2. The loading device as claimed in claim 1, characterized in that the lower portion of the telescopic column is equipped with a locking device (25) for selectively locking the upper portion (11) in one or more extended positions.

3. The loading device as claimed in claim 1, characterized in that the each guide member of the extension arm is a guide roller rotatably mounted about an axis of rotation parallel to the swivel axis of the extension arm, which guide roller has a diameter conforming to the constriction between the cam tracks.

4. The loading device as claimed in claim 1, characterized in that the extension arm is equipped with a locking bar arranged to engage a locking projection protection of the column head as a protection against reversal.

5. The loading device as claimed in claim 1, characterized in that the telescopic column together with the actuating cylinders are mounted on a carriage of the bracket the carriage being movable transverse to the swivel axis.

6. The loading device as claimed in claim 1, characterized in that the bracket has an upper structure downwardly pivoted about a lying transverse axis, which carries the telescopic column together with the actuating cylinders.

* * * * *